UNITED STATES PATENT OFFICE.

GEORGE W. ELDRIDGE, OF SOUTH CHATHAM, MASSACHUSETTS.

IMPROVEMENT IN FIRE-KINDLING.

Specification forming part of Letters Patent No. 101,597, dated April 5, 1870.

*To all whom it may concern:*

Be it known that I, G. W. ELDRIDGE, of South Chatham, in the county of Barnstable, and in the State of Massachusetts, have invented certain new and useful Improvements in Fire-Kindlers; and I do hereby declare that the following is a full, clear, and exact description thereof.

The nature of my invention consists in the preparation of a fire-kindler from tree-leaves, grasses, straw, or other similar materials.

In order to enable others skilled in the art to which my invention appertains to make and use the same, I will now proceed to describe the manner in which the same is or may be prepared.

I procure pine-tree leaves or leaves of other trees, when dry, if possible; or, if not dry, I dry them by spreading in the sun or by artificial heat. The leaves are then cut with a machine to about one inch in length; or they may be used without cutting, if not convenient to do so.

A preparation or liquor for sticking them together is then made, as follows: Take about eight parts of rosin or pitch, and one part of crude kerosene or other inflammable oil. First melt the rosin and heat it nearly to boiling, then add the oil, and stir the whole until thoroughly mixed, when it is ready for use. Now take the leaves and put them into a large pan, which is placed on a stove or furnace, and heat them until quite hot, continually stirring. Then add the liquor or preparation above described by pouring or sprinkling gradually onto the leaves, continually stirring until they are thoroughly saturated with the liquor; then, while hot, pour the mixture onto a bench or table, spread and roll it into sheets about an inch in thickness; then, while warm, take powdered rosin, or its equivalent, a similar dry, inflammable powder, spread or sprinkle it on them slightly, which hardens them and prevents their sticking together when put into packages. They are then cut into pieces about two inches square, then spread them upon boards or sheets to dry. After drying three or four days they are ready for use.

Upon experiments I have found that dried grasses, or rye, wheat, oat, or barley straw, prepared properly, answers very well for kindlers.

In preparing the liquor for mixing with the leaves, grasses, &c., I do not confine myself to any exact proportions of the ingredients, as they may be varied somewhat, according to circumstances.

Having thus fully described my invention, what I claim as new, and desire to secure by Letters Patent, is—

1. A fire-kindler made from dried leaves, grass, straw, or other equivalent materials.

2. The manner herein described of treating dried leaves, &c., for the purpose of making a fire-kindler, substantially as set forth.

3. The compound herein described, consisting of rosin and inflammable oil, when used substantially for the purposes herein set forth.

4. The combination of dried leaves, grass, straw, or other equivalent materials, with a compound consisting of rosin and inflammable oil, substantially for the purposes herein set forth.

5. The manner herein described of preparing a fire-kindler from dried leaves, &c., rosin, and inflammable oil, substantially as set forth.

6. The use of powdered rosin or other inflammable powder, substantially in the manner and for the purposes herein set forth.

In testimony that I claim the foregoing I have hereunto set my hand this 8th day of March, 1870.

GEORGE W. ELDRIDGE.

Witnesses:
KIMBALL ELDRIDGE,
HIRA NICKERSON.